United States Patent
Townson et al.

(10) Patent No.: US 9,222,288 B2
(45) Date of Patent: Dec. 29, 2015

(54) INTEGRATED HOOD LATCH KEEPER FOR A GRILL OPENING REINFORCEMENT STRUCTURE

(71) Applicant: GM GLOBAL TECHNOLOGY OPERATIONS LLC, Detroit, MI (US)

(72) Inventors: James M. Townson, Clarkston, MI (US); Mark L. Felzien, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 273 days.

(21) Appl. No.: 13/735,429

(22) Filed: Jan. 7, 2013

(65) Prior Publication Data
US 2014/0061407 A1 Mar. 6, 2014

Related U.S. Application Data

(60) Provisional application No. 61/696,150, filed on Sep. 1, 2012.

(51) Int. Cl.
| | |
|---|---|
| *E05C 3/16* | (2006.01) |
| *E05B 79/04* | (2014.01) |
| *E05B 83/24* | (2014.01) |
| *B62D 25/08* | (2006.01) |

(52) U.S. Cl.
CPC .............. *E05B 79/04* (2013.01); *B62D 25/084* (2013.01); *E05B 83/24* (2013.01)

(58) Field of Classification Search
USPC ............ 292/216, DIG. 14, DIG. 23, DIG. 43, 292/DIG. 53, DIG. 64
See application file for complete search history.

(56) References Cited

U.S. PATENT DOCUMENTS

| | | | | | |
|---|---|---|---|---|---|
| 3,630,557 | A | * | 12/1971 | Pierce et al. | 292/45 |
| 4,456,289 | A | * | 6/1984 | Badiali | 292/28 |
| 4,679,836 | A | * | 7/1987 | Pupillo et al. | 292/216 |
| 4,896,907 | A | * | 1/1990 | Hayakawa et al. | 292/216 |
| 4,971,370 | A | * | 11/1990 | Detweiler et al. | 292/45 |
| 5,150,933 | A | * | 9/1992 | Myslicki et al. | 292/216 |
| 5,222,775 | A | * | 6/1993 | Kato | 292/201 |
| 5,238,274 | A | * | 8/1993 | Becker et al. | 292/201 |
| 5,306,053 | A | * | 4/1994 | Gurusami et al. | 292/278 |
| 5,429,400 | A | * | 7/1995 | Kawaguchi et al. | 292/201 |
| 5,445,421 | A | * | 8/1995 | Ferrara | 292/216 |
| 5,618,069 | A | * | 4/1997 | Konchan et al. | 292/216 |
| 6,014,876 | A | * | 1/2000 | Taylor | 70/240 |
| 6,267,420 | B1 | * | 7/2001 | Miyagawa | 292/216 |
| 6,280,592 | B1 | * | 8/2001 | Mastrofrancesco et al. | 204/485 |
| 6,581,987 | B1 | * | 6/2003 | Gentile et al. | 292/216 |

(Continued)

*Primary Examiner* — Bradley Duckworth
(74) *Attorney, Agent, or Firm* — Cantor Colburn LLP (57) ABSTRACT

A position-controlled front hood latch bracket for a vehicle includes a bracket base having a hood latch opening configured to receive a hood latch assembly having a latch base, the latch base having a perimeter and a plurality of locating apertures. The front hood latch bracket also includes a plurality of spaced-apart hood latch keeper features, the hood latch keeper features configured to receive and keep the perimeter of the latch base in slidable engagement with the bracket base while enabling a predetermined amount of movement of the latch base relative to the bracket base in a pre-assembly position. The bracket further includes a plurality of fastener apertures each configured to receive a fastener for detachably attaching the latch base to the bracket base, the locating apertures having a size and a location that exposes the fastener apertures in the preinstallation position regardless of the predetermined amount of movement.

11 Claims, 9 Drawing Sheets

(56) References Cited

U.S. PATENT DOCUMENTS

| | | | |
|---|---|---|---|
| 6,695,361 B1 * | 2/2004 | Gleason et al. | 292/216 |
| 8,157,300 B2 * | 4/2012 | Niskanen et al. | 292/216 |
| 8,348,310 B2 * | 1/2013 | Vazquez et al. | 292/217 |
| 8,544,901 B2 * | 10/2013 | Krishnan et al. | 292/216 |
| 2001/0024041 A1 * | 9/2001 | Barczynski et al. | 292/216 |
| 2002/0101082 A1 * | 8/2002 | Schwaiger | 292/216 |
| 2006/0006668 A1 * | 1/2006 | Hidding et al. | 292/216 |
| 2006/0012184 A1 * | 1/2006 | Ottesen et al. | 292/216 |
| 2006/0170224 A1 * | 8/2006 | Mitchell et al. | 292/216 |
| 2007/0182165 A1 * | 8/2007 | Yoshikuwa et al. | 292/216 |
| 2008/0217929 A1 * | 9/2008 | Zweibohmer | 292/216 |
| 2011/0006551 A1 * | 1/2011 | Konchan et al. | 292/216 |
| 2013/0300134 A1 * | 11/2013 | Jayasuriya et al. | 292/129 |
| 2014/0210220 A1 * | 7/2014 | Limberg et al. | 292/216 |

* cited by examiner

INTEGRATED HOOD LATCH KEEPER FOR A GRILL OPENING REINFORCEMENT STRUCTURE

CROSS-REFERENCES TO RELATED APPLICATIONS

This patent application claims priority to U.S. Provisional Patent Application Ser. No. 61/696,150 filed, Sep. 1, 2012, which is incorporated herein by reference in its entirety.

FIELD OF THE INVENTION

The subject invention relates to vehicles, more particularly to a positioning and reinforcement structure for a vehicle, and more particularly to a hood latch keeper for positioning a hood latch.

BACKGROUND

Vehicles, such as automobiles, are assembled by aligning and fastening numerous components and subassemblies to one another. One region of the automobile requiring assembly of such components and subassemblies is a front end region. This portion of the vehicle is frequently assembled as an assembly or subassembly referred to as a "front clip." The front clip is commonly defined as the assembly comprising the portion of the vehicle extending from the A-pillar (the roof support pillar associated with the front windscreen) to the most forwardly disposed component, typically a front bumper. The front clip includes a structural frame, as well as a variety of vehicle components that collectively form the vehicle body.

Several efforts to directly or indirectly mount and/or fix the vehicle body components to each other, as well as to the vehicle frame, have relied on welded support structures or frames and machined body mounting locations for the body components. Approaches relying on such body mounting locations have undesirably led to large variations in alignment and fastening of components to each other. These large variations may influence the aesthetic appearance of the automobile to a user by providing nonuniform or undesirably large or small gaps and spacings between components and may be the cause of functional deficiencies, such as undesirable large opening/closing efforts, alignment and mutilation of components due to misalignment and interference, and non-uniform gaps and spacings, which each may affect consumer satisfaction.

One area of concern in the front clip has been the hood latch, and more particularly, in setting the front end sheet metal off the floating structure of a full size truck there needs to be a way to set the primary hood latch in an optimal position so there is no lateral force on the hood latch striker that would increase opening and closing efforts. Typically the position of the hood is set using a temporary fixture that enables the trend build for position, which is an empirical estimate of best fit of the fixture based on prior build experience taking into consideration tolerance stack-ups and other factors. While this is an effective method of setting the hood latch it requires use of a temporary fixture with each vehicle built and does not provide a built-in vehicle fixture for individual and repeatable setting of the primary hood latch in the optimal position while the hood is closed and parallel to the fenders on each side.

Accordingly, it is desirable to avoid the use of a temporary fixture and to provide a built-in device to establish the optimal position of the hood latch relative to the striker in order to provide a desired combination of the proper function of the latch and an aesthetic appearance of the front hood in the front clip.

SUMMARY OF THE INVENTION

In one exemplary embodiment, a position-controlled front hood latch bracket for a vehicle is disclosed. The position-controlled front hood latch bracket includes a bracket base having a hood latch opening configured to receive a hood latch assembly having a latch base, the latch base having a perimeter and a plurality of locating apertures. The front hood latch bracket also includes a plurality of spaced-apart hood latch keeper features, the hood latch keeper features configured to receive and keep the perimeter of the latch base in slidable engagement with the bracket base while enabling a predetermined amount of movement of the latch base relative to the bracket base in a pre-assembly position. The front hood latch bracket further includes a plurality of fastener apertures each configured to receive a fastener for detachably attaching the latch base to the bracket base, the locating apertures having a size and a location that exposes the fastener apertures in the preinstallation position regardless of the predetermined amount of movement.

In another exemplary embodiment, a position-controlled front hood latch bracket assembly for a vehicle is disclosed. The front hood latch bracket assembly includes a positioning and reinforcement structure for a front end clip of a vehicle, the positioning and reinforcement structure comprising a plurality of position reference features for locating and fixing the positions of a plurality of vehicle components comprising the front end clip. The front hood latch bracket assembly also includes a latch bracket that is configured to capture and retain a front hood latch assembly as one of the vehicle components in slidable engagement with a predetermined amount of movement, the latch bracket attached to the positioning and reinforcement structure in a predetermined location.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

The following description is merely exemplary in nature and is not intended to limit the present disclosure, its application or uses. It should be understood that throughout the drawings, corresponding reference numerals indicate like or corresponding parts and features.

Referring to the Figures, and more particularly FIGS. 1-9, a hood latch support bracket 420 for use in conjunction with assembly of a front hood latch assembly 400 to a grill opening reinforcement (GOR) structure 30 is disclosed. Use of the hood latch support bracket 420 in conjunction with the GOR structure 30 advantageously avoids the need to use a temporary fixture to place the front hood latch assembly 400 in an optimal position and provides a built-in device to establish the optimal position of a hood latch 410 relative to the striker in order to provide a desired combination of the proper function of the hood latch 410 and an aesthetic appearance of the hood 404 in a front end assembly 10.

Figure 1:
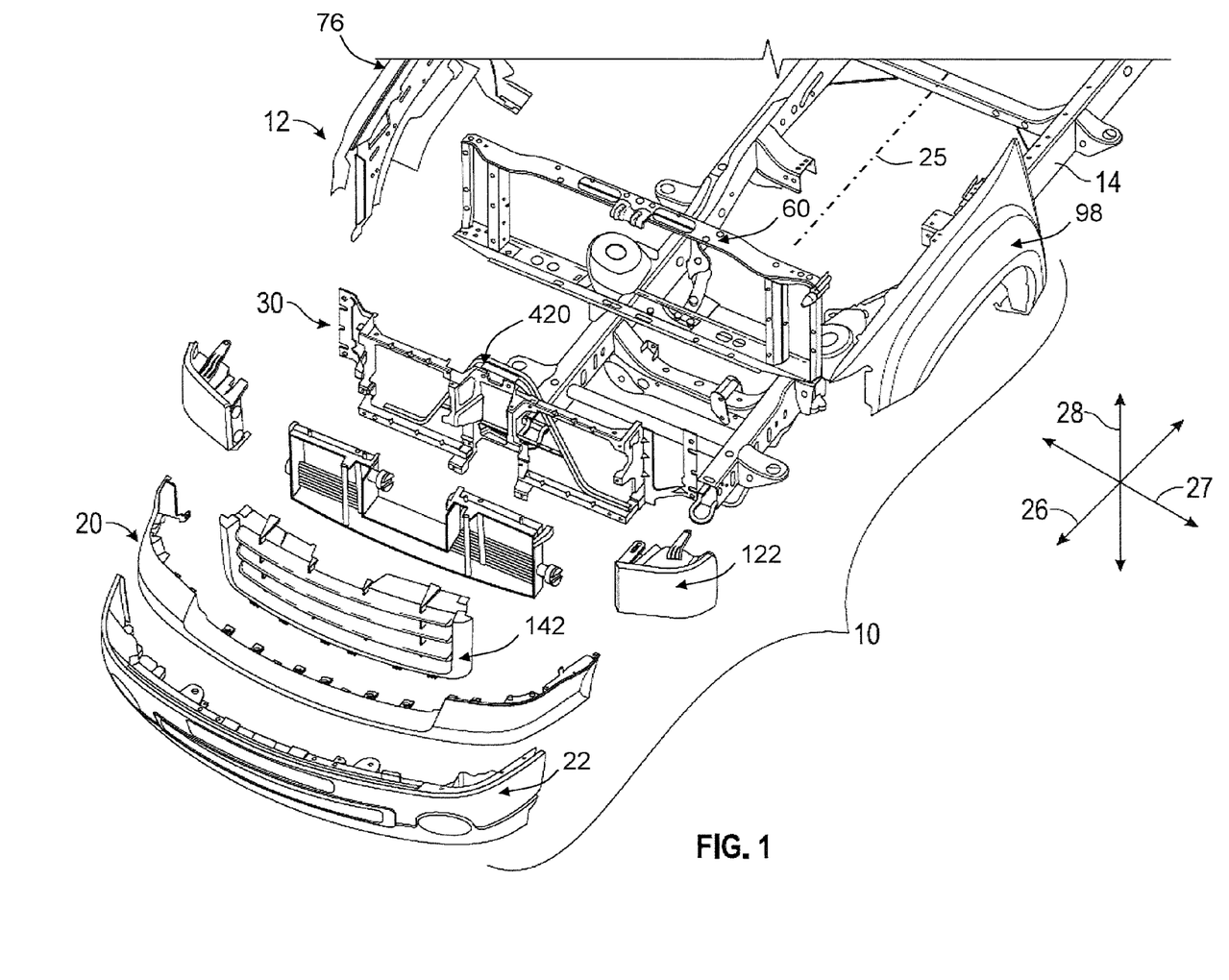
FIG. 1 is a simplified, partially disassembled perspective view of a front end assembly of a vehicle.

Referring to FIG. 1, in accordance with an exemplary embodiment of the invention, a partially disassembled view of a front end assembly 10 of a vehicle 12 is shown in the form of an automobile. Although the vehicle 12 is illustrated as an automobile, it is to be appreciated that the embodiments disclosed herein may be employed in combination with various alternative types of vehicles. With respect to an automobile, it is to be further appreciated that the specific type of automobile is irrelevant to carrying out the embodiments described below. For example, the automobile may include a car, truck, sport utility vehicle (SUV) or van. The preceding list is merely illustrative and is not intended to be limiting of the numerous automobile types that may benefit from the embodiments of the invention.

The vehicle 12 includes a frame 14 formed of several integrally formed or operably coupled components to provide a structural support configured to directly or indirectly support components and subassemblies for the vehicle 12. Supported components and subassemblies include a plurality of body components and the vehicle 12 is typically referred to as having a body-on-frame construction, based on the direct or indirect mounting and fixing of the various components to the frame 14. The front end assembly 10 is the region of the vehicle 12 that is defined by a portion of the vehicle 12 extending forward from what is known conventionally as an "A-pillar" to a forwardmost component, such as a front bumper 20. The front end assembly 10 may be interchangeably referred to as a "front clip" of the vehicle 12.

To facilitate assembly of the front end assembly 10, both with respect to components in relation to each other as well as to the frame 14, a positioning and reinforcement structure 30 is included. The positioning and reinforcement structure 30 generally refers to a structure configured to provide a foundation for inter-part dimensional relationships during the assembly process for all components of the front end assembly 10, thereby alleviating reliance on individual machined mounting locations. In one embodiment, the positioning and reinforcement structure 30 comprises a grill opening reinforcement (GOR) structure that acts to define and reinforce a grill opening. Since the positioning and reinforcement structure 30 may be formed as an assembly, it may also be referred to herein as a positioning and reinforcement structure 30 or a GOR assembly. As will be described in detail below, the positioning and reinforcement structure 30 includes locators, fastening features, and other critical dimensional relationship interfaces of several components and subassemblies. Such components and subassemblies typically include fender assemblies 76, 98, headlamps 122, grills 142, fascias 22, bumpers 20 and bumper attachment features, hoods 404, hood latches 410, hood bumpers 18 and under-hood closeout panels, air baffles and radiator supports 60, for example. It is to be understood that the preceding list is merely illustrative of the numerous components and subassemblies which may be included in the front end assembly 10 and may benefit from the positioning and reinforcement structure 30. Exemplary components and subassemblies will be described in detail below. As used herein, an axial direction 26 refers to a direction that extends frontward and rearward along an along a central axis 25 of the vehicle, a cross-car direction 27 refers to a direction that extends laterally or across the vehicle and a vertical direction 28 refers to a direction that extends upwardly and downwardly. In one embodiment, these directions are mutually orthogonal with regard to one another.

Figure 2:
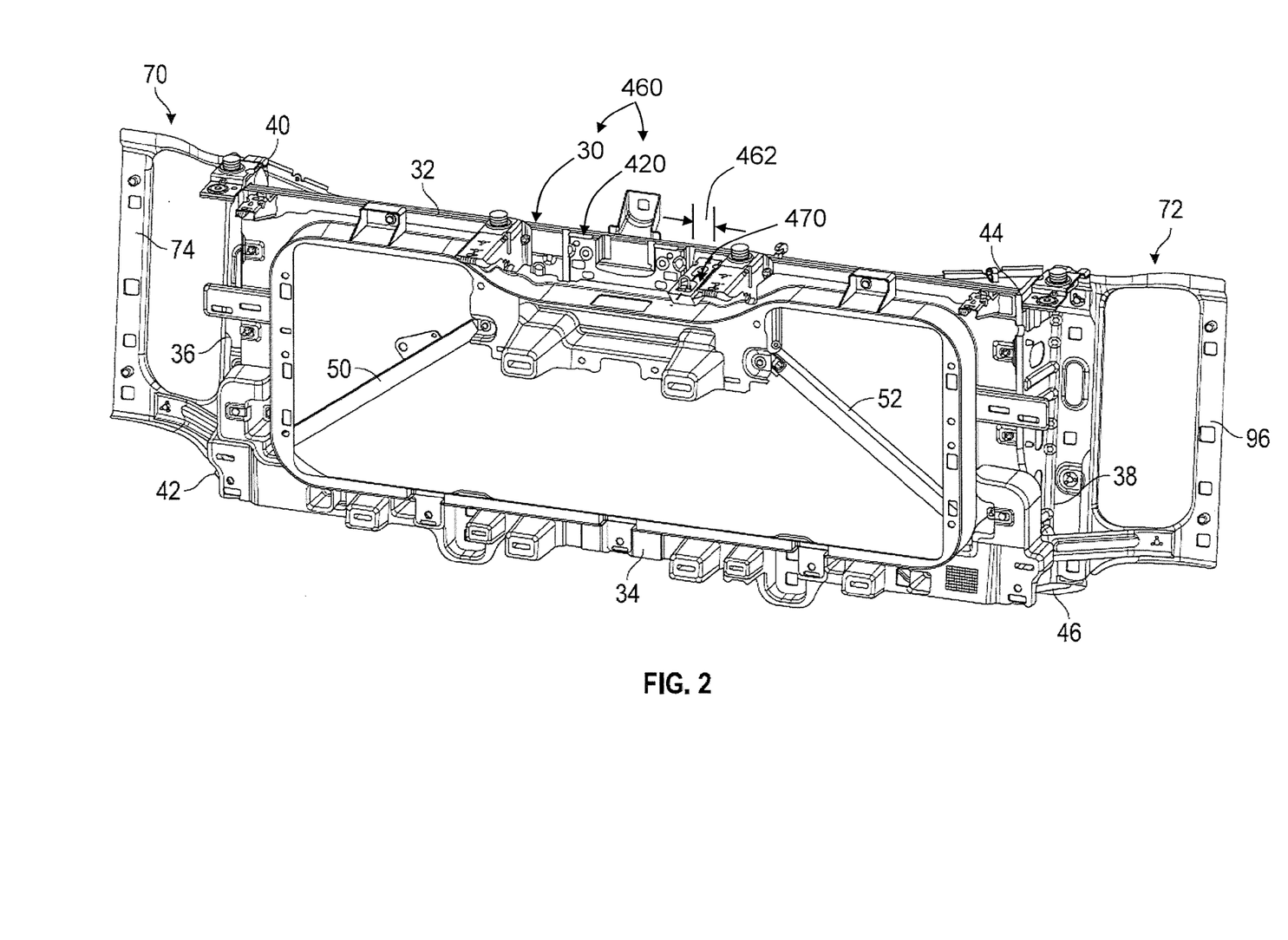
FIG. 2 is a perspective view of a positioning and reinforcement structure of the front end assembly.
Figure 3:
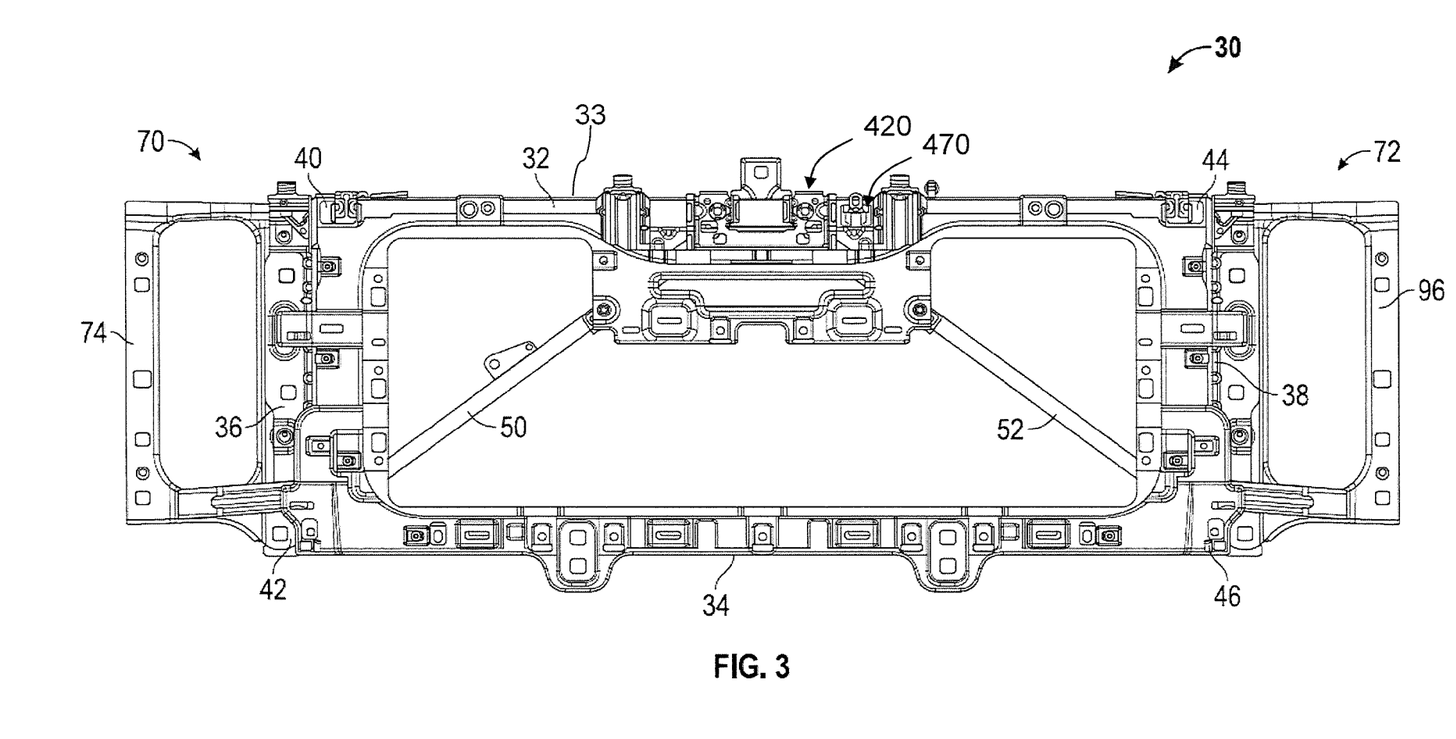
FIG. 3 is a front elevational view of the positioning and reinforcement structure.

Referring now to FIGS. 2-3, in conjunction with FIG. 1, the positioning and reinforcement structure 30 is illustrated in greater detail. The positioning and reinforcement structure 30 includes a rectilinearly situated geometry defined by a top support member 32, a bottom support member 34, a first side member 36 and a second side member 38. The top support member 32 and the bottom support member 34 each extend relatively horizontally in a cross-car direction 27 and relatively parallel to each other. The first side member 36 and the second side member 38 extend relatively parallel to each other, but in a relatively vertical 28 direction. As may be understood the positioning and reinforcement structure 30 is therefore a substantially cross-car extending and vertically extending structure or frame. The first side member 36 is coupled proximate a first side member top region 40 to the top support member 32 and to the bottom support member 34 proximate a first side member bottom region 42. Likewise, the second side member 38 is coupled proximate a second side member top region 44 to the top support member 32 and to the bottom support member 34 proximate a second side member bottom region 46. The coupling between the top support member 32, the bottom support member 34, the first side member 36 and the second side member 38 may be in the form of an integral formation process so as to form an integral positioning and reinforcement structure 30, such as by casting, laser welding or spot welding, for example. Alternatively, an operable coupling may facilitate the formation of the positioning and reinforcement structure 30 as an assembly, such as by mechanical fasteners, for example. Alternatively, an operable coupling may facilitate the formation of the positioning and reinforcement structure 30 as an assembly, such as by mechanical fasteners, for example. The preceding examples of the precise connections between the top support member 32, the bottom support member 34, the first side member 36 and the second side member 38 are merely illustrative and numerous alternative coupling configurations are contemplated. Irrespective of the precise attachment, the top support member 32, the bottom support member 34, the first side member 36 and the second side member 38 form a central portion 39 of the positioning and reinforcement structure 30.

Furthermore, the above-described components associated with the positioning and reinforcement structure 30, as well as those described below, may comprise various materials, such as plastic or a metal. Additionally, the components may be formed as an over-mold having more than one material forming one or more of the components. Such materials may include magnesium, aluminum, and composites, for example, however, many alternative materials are contemplated. The positioning and reinforcement structure 30 or GOR structure may have any suitable size and shape, and may be used, for example, to define and reinforce a grill opening having any suitable size and shape.

The positioning and reinforcement structure 30 also includes a first brace 50 extending in a relatively diagonal manner from proximate the first side member bottom region 42 to a relatively central location along the top support member 32, to which the first brace 50 is operably coupled. The first brace 50 may be coupled to the first side member 36 or the bottom support member 34, or both. Similarly, a second brace 52 is included and extends in a relatively diagonal manner from proximate the second side member bottom region 46 to the top support member 32, to which the second brace 52 is attached. The second brace 52 may be coupled to the second side member 38 or the bottom support member 34, or both. The first brace 50 and the second brace 52 may be operably coupled to the top support member 32 in a relatively coaxial manner, such that the first brace 50 and the second brace 52 mount to a single location of the top support member 32. The first brace 50 and the second brace 52, both singularly and in combination, provide structural support for the overall positioning and reinforcement structure 30. Additionally, the first brace 50 and/or the second brace 52 include mounting and locating features corresponding to components integrated with, or associated with, the positioning and reinforcement structure 30.

Referring again to FIGS. 2-3, the positioning and reinforcement structure 30 includes a first wing structure 70 and a second wing structure 72, with the first wing structure 70 being detachably coupled to the first side member 36, while the second wing structure 72 is detachably coupled to the second side member 38. The first wing structure 70 includes a first side flange 74 proximate an outermost location of the first wing structure 70 for fixing the positioning and reinforcement structure 30 to a first fender assembly. The second wing structure 72 includes a second side flange 96 proximate an outermost location of the second wing structure 72 for fixing the positioning and reinforcement structure 30 to a second fender assembly.

As indicated, the positioning and reinforcement structure 30 is used to establish predetermined visual modalities by the positioning and attachment of one or more components of the front end clip or assembly 10, and preferably a plurality of the components of the front end clip, particularly those components that are directly visible, or those components that are not directly visible, but whose position directly or indirectly effects the position of components that are directly visible. The predetermined visual modalities may include positioning various components with various predetermined gaps and spacings, including three-dimensional gaps and spacings, and particularly uniform gaps and spacings.

Referring to FIGS. 4-9 in one embodiment, this includes providing a modality for establishing a predetermined position 480 for the front hood latch assembly 400, including an optimal position as described herein, wherein the cross-car or lateral stresses between the latch and an associated striker 402 that is attached proximate the structural front end portion 405 of the front hood 404 when the hood is closed and the striker engages the latch to secure the hood in the closed position are minimized. While this is not generally directly visible, it can directly affect visible components, such as by affecting the position of the front hood 404, and the gaps and spacings of the hood 404 in relation to adjacent components, such as the front fenders 76, 98 as further described in co-pending U.S. Patent Applications 61/695,667, filed on Aug. 31, 2012, and 61/695,695, filed on Aug. 31, 2012, which are assigned to the same Assignee as this application, and which are hereby incorporated by reference herein in their entirety.

Figure 8:
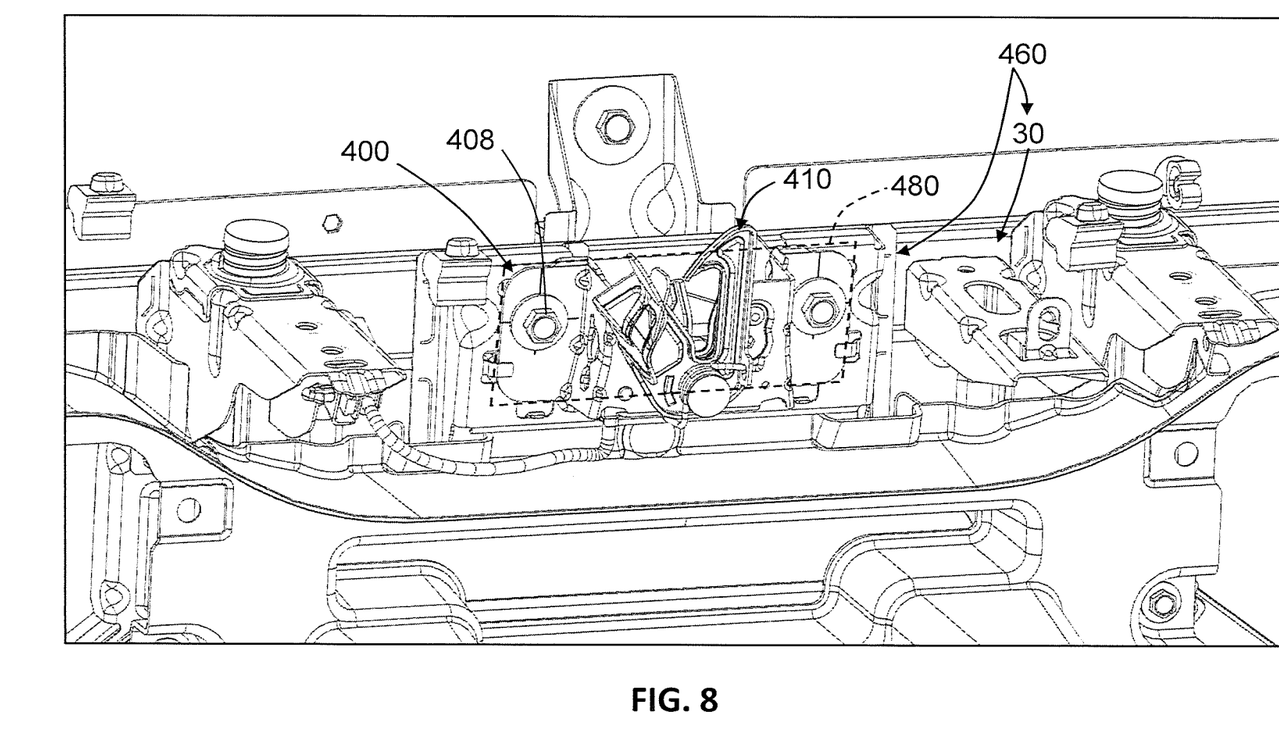
FIG. 8 is a front perspective view of the embodiment of FIG. 4 with the front hood latch assembly detachably attached to the front hood latch bracket using threaded fasteners.

The predetermined position 480 of the front hood latch assembly 400 may be established using the hood latch support bracket 420 in conjunction with the positioning and reinforcement structure 30. The hood latch support bracket 420 is attached to the positioning and reinforcement structure 30 and designed to allow for rough locating of the front hood latch assembly 400 while maintaining a slip plane to self-adjust to the positioning of the striker 402 both in a lateral or cross-car direction 27 and a vertical direction 28. This allows for a "free-state" positioning of the front hood latch 410 and provides resistance to engage the latch and striker 402 when the front hood 404 is closed. Once the front hood latch 410 and striker 402 are engaged and the hood 404 is closed, the front hood latch assembly 400 may be fixed, either permanently by welding or the use of any suitable permanent attachment device or mechanism or preferably by using a selectively attachable and detachable affixing device, such as a threaded fastener 408, to the latch support bracket 420 and the positioning and reinforcement structure 30, thereby fixing the front hood latch 410 and front hood latch assembly 400 in the predetermined position 480 (FIG. 8). The predetermined position 480 may be any suitable predetermined position 480, and will preferably be a position that allows the front hood 404, and more particularly the striker 402, to latch closed without binding the front hood latch 410 and with the hood positioned parallel to the fenders on each side.

Latch keeper features 440 are integrated into the positioning and reinforcement structure 30 using a latch support bracket 420. The latch support bracket 420 carries the threaded fasteners that secure the front hood latch assembly 400 to the positioning and reinforcement structure 30 and has a relative position to vertical and lateral features on the perimeter of the latch base that loosely captures the front hood latch assembly 400 in slidable engagement. The latch keeper features 440 are designed to allow for and accommodate a predetermined amount of possible lateral and vertical positional variation between the latch 410 and the striker 402 while locked and the front hood latch bracket 420 whose position is fixed to the positioning and reinforcement structure 30 with reference to a primary centering feature, as described herein. The latch support bracket 420 also provides vertical support of the latch to allow the hood striker to be fully engaged when closed and centered in the opening between the fenders.

Figure 6:
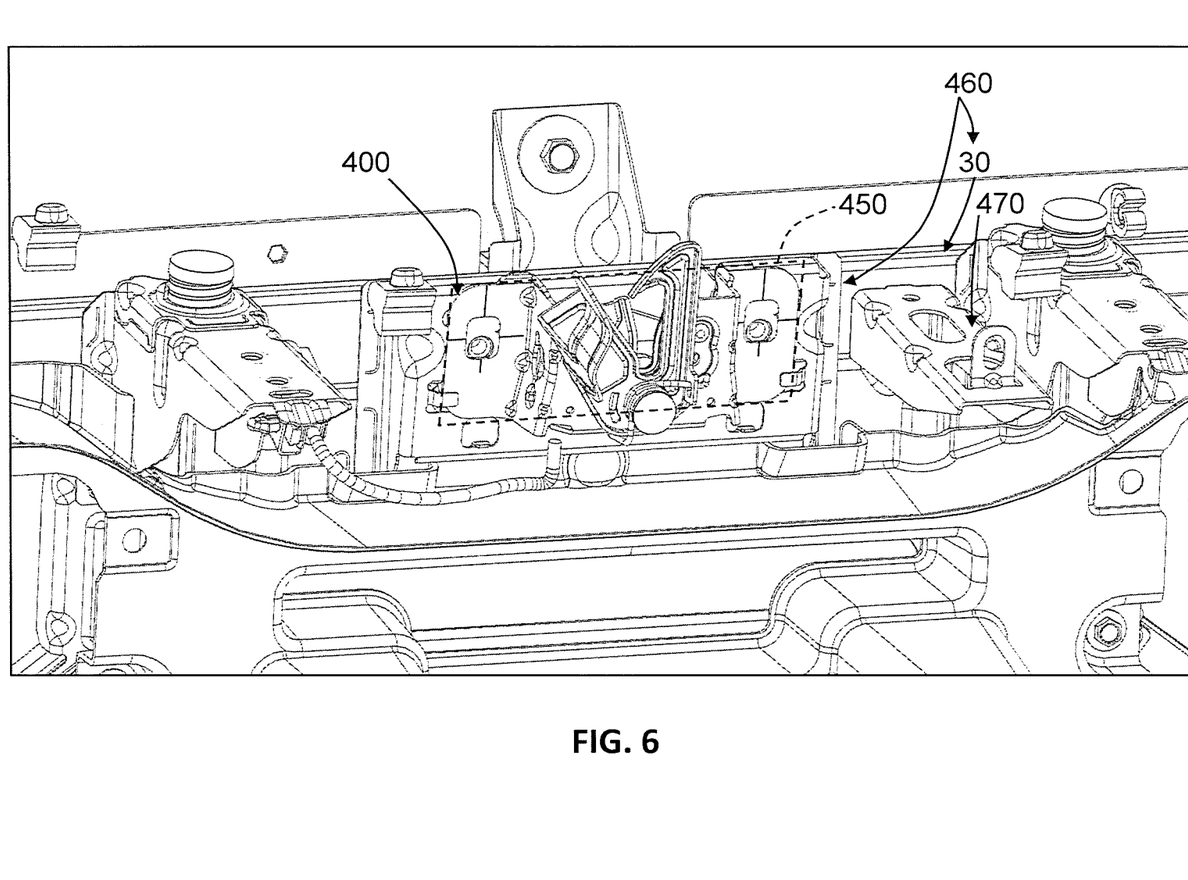
FIG. 6 is a front perspective view of the embodiment of FIG. 4 with the front hood latch assembly partially inserted in the front hood latch bracket.
Figure 7:
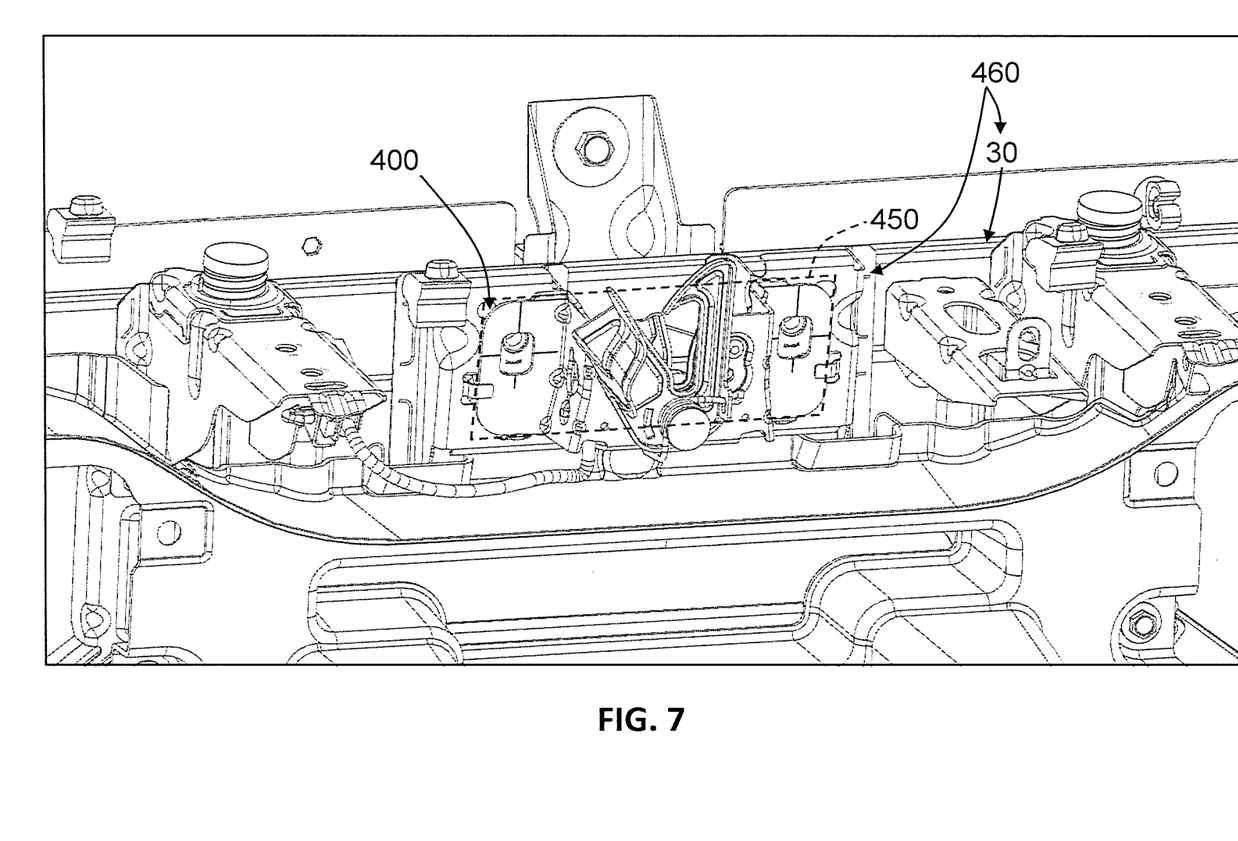
FIG. 7 is a front perspective view of the embodiment of FIG. 4 with the front hood latch assembly fully inserted into the front hood latch bracket.

Referring to FIGS. 4-9, a position-controlled front hood latch bracket 420 for a vehicle 12 is disclosed. The hood latch bracket 420 includes a bracket base 422 having a hood latch opening 424 configured to receive the hood latch assembly 400. The bracket base 422 and hood latch opening 424 may be of any suitable size and shape, including the generally rectangular shapes shown in FIG. 4 having two opposing sides 425 and a lower edge 427. The front hood latch assembly 400 includes a pivotally movable front hood latch 410 and latch base 412. The front hood latch 410 is biased by an operably engaged latch spring 411 and manually operably movable about a pivot pin 415 using a paddle-shaped latch actuator 413. The latch base 412 has a perimeter 414 and a plurality of locating apertures 416. The hood latch bracket 420 also includes a plurality of spaced-apart hood latch keeper features 440. The hood latch keeper features 440 are configured to receive and keep or retain the perimeter 414 of the latch base 412 in slidable engagement with the bracket base 422 during installation while enabling a predetermined amount of movement of the latch base 412 relative to the bracket base in a preinstallation position 450. FIGS. 6-7 illustrate two possible preinstallation positions 450 and the possible range of vertical sliding movement of the perimeter 414 of the latch base 412 while it is in slidable engagement with the bracket base 422 during installation. Any suitable number of hood latch keeper features 440 may be incorporated, including the embodiment illustrated that utilizes four hood latch keeper features. The front hood latch bracket 420 also includes a plurality of fastener apertures 426 each configured to receive a selectively attachable and detachable fastener 408, such as a threaded bolt, for detachably attaching the latch base 412 to the bracket base 422. Any suitable number of fastener apertures 426 may be used, including the embodiment illustrated that incorporates two apertures. The fastener apertures 426 may include threaded apertures, such that the fastener 408 may engage and be tightened into the aperture directly, or unthreaded apertures, such that the fastener requires another device for tightening (e.g. a threaded bore (not shown) in the positioning and reinforcement structure 30 or a threaded nut (not shown). Locating apertures 416 in the latch base have a predetermined size, shape and location that expose the fastener apertures 426 (FIGS. 6 and 7) in the preinstallation position 450 regardless of the predetermined amount of movement of the front hood latch assembly 400.

The front hood latch bracket 420 may be made from any suitable material using any suitable manufacturing or fabrication process. In one embodiment, the front hood latch bracket 420 is formed as a metal stamping from a formable, high strength metal sheet, such as various grades of steel or aluminum alloy sheet, including various grades of carbon steel and high strength low alloy steel.

Figure 4:
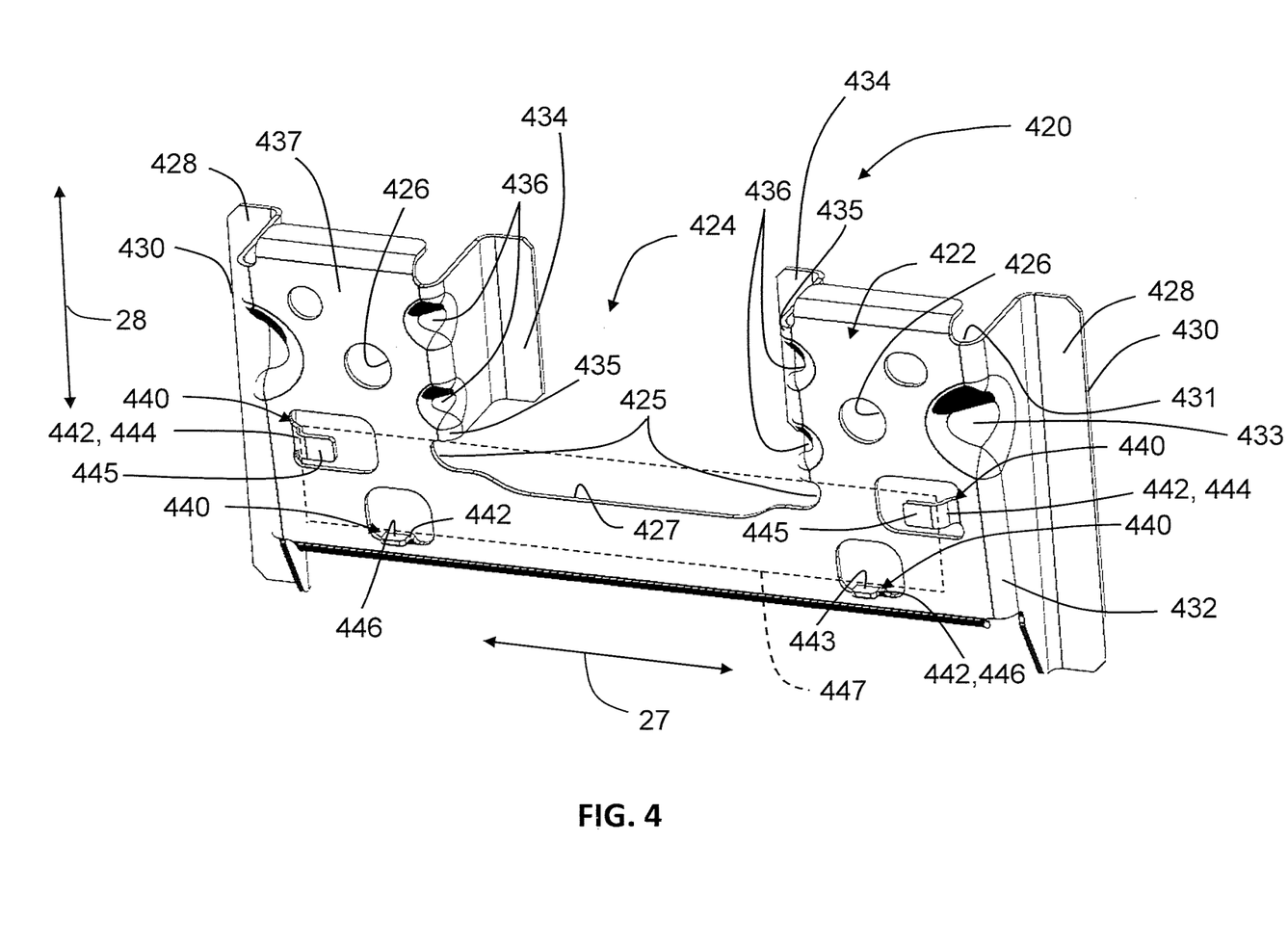
FIG. 4 is a front perspective view of an embodiment of a front hood latch bracket.
Figure 5:
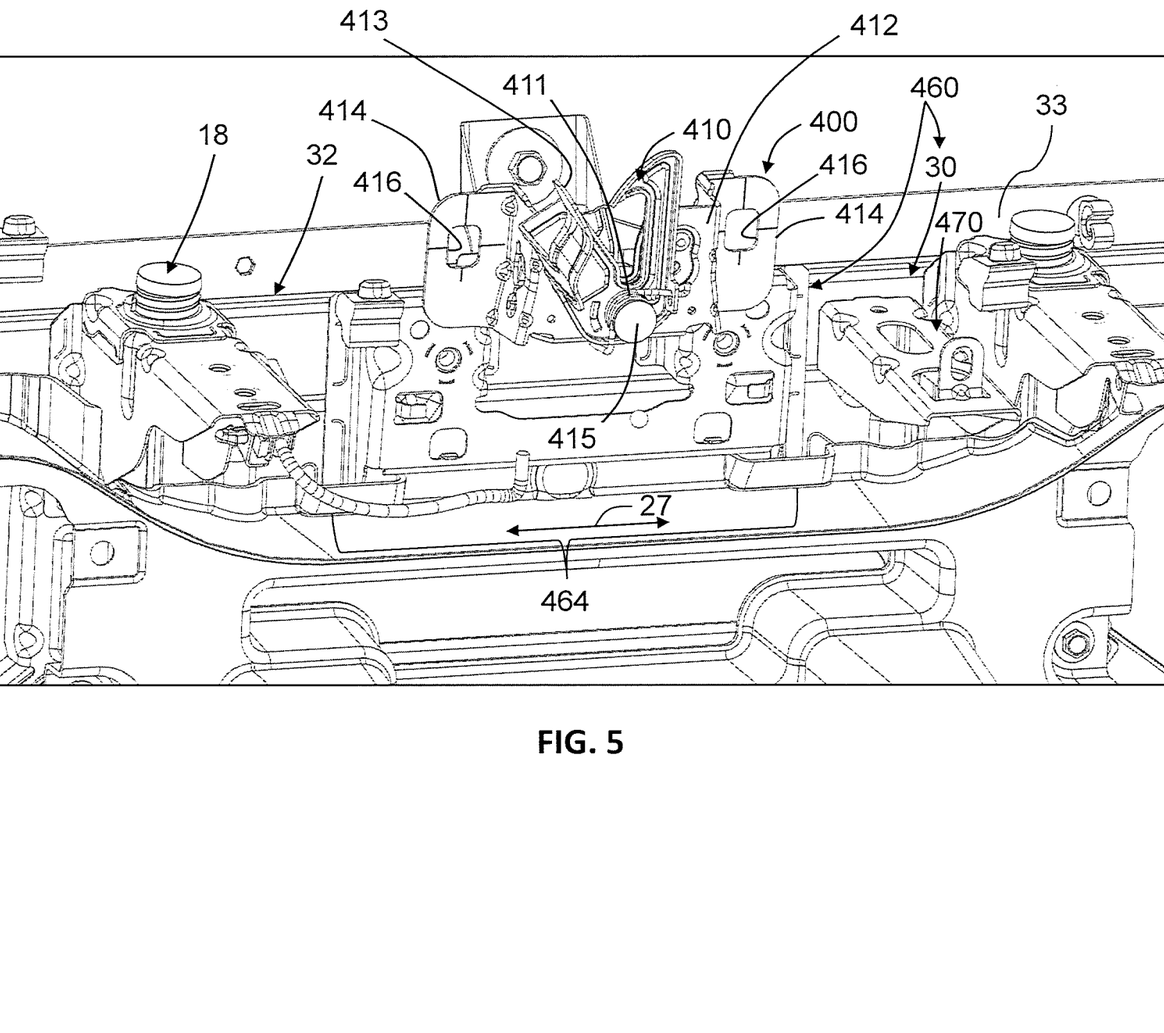
FIG. 5 is a front perspective view of an embodiment of a front hood latch bracket, front hood latch bracket assembly and front hood latch assembly removed or prior to insertion as disclosed herein.
Figure 9:
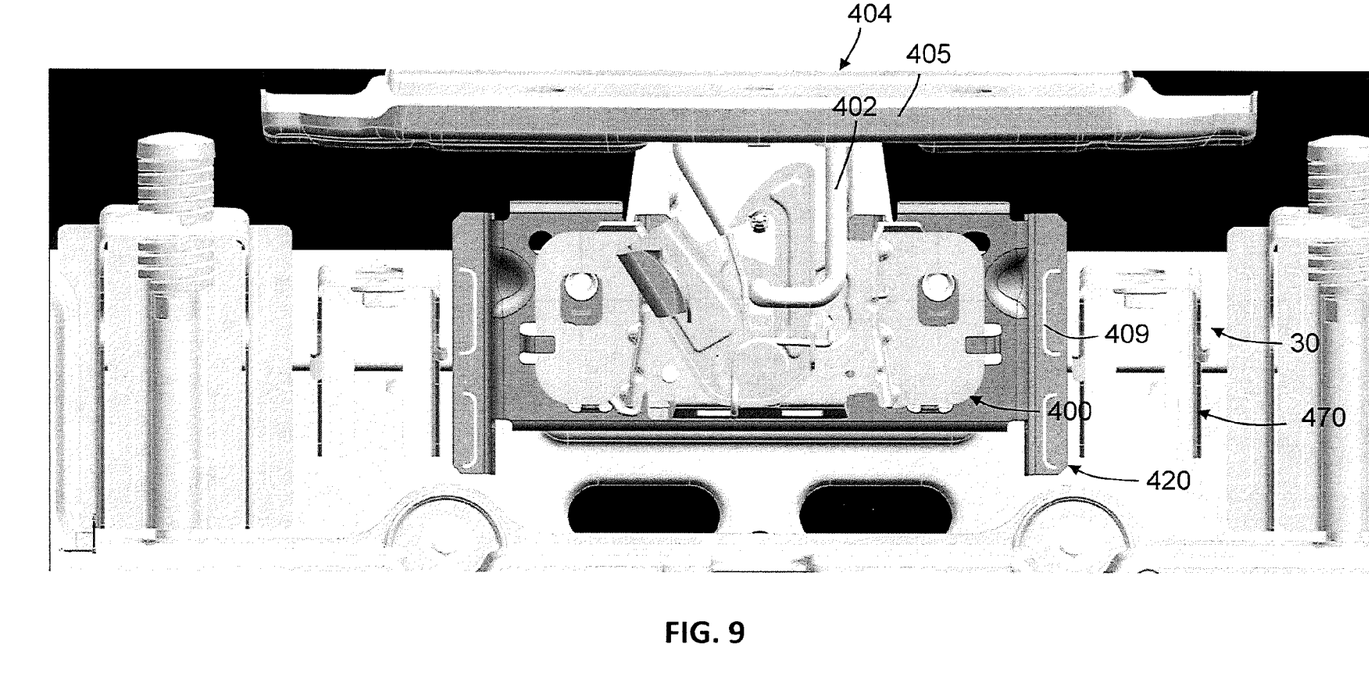
FIG. 9 is a front perspective view of an embodiment of a front hood latch bracket, front hood latch bracket assembly and front hood latch assembly operatively engaged with a front hood and striker, wherein the front hood latch assembly is in a free state and the lowermost position within the front hood latch bracket as might be obtained by closing the hood to establish a preinstallation position of the front hood latch assembly as disclosed herein.

Referring to FIGS. 4 and 9, in one embodiment, the front hood latch bracket 420 also includes a pair of spaced-apart outer support structure attachment flanges 428 on opposed ends 430 of the bracket base 422. The outer support structure attachment flanges 428 may be used to attach the front hood latch bracket 420 to the positioning and reinforcement structure 30. The flanges may be attached by any suitable fastening device or other form of attachment, including a weld joint 409 (FIG. 9). In one embodiment, the outer support structure attachment flanges 428 may include integrally-formed (with the bracket base 422), L-shaped flanges that extend outwardly from the ends 430 and outwardly away from a rear surface 431 of the bracket base 422. In one embodiment, the corner 432 between each outer support structure attachment flange 428 and the bracket base 422 may include a deformed pocket 433. The deformed pockets 433 may be formed during stamping of the front hood latch bracket 420 and used to increase the stiffness of the flanges 428 and the overall stiffness of the bracket.

In one embodiment, the front hood latch bracket 420 also includes a pair of spaced-apart inner support structure attachment flanges 434 on opposed sides 425 of the hood latch opening 424. In one embodiment, inner support structure attachment flanges 434 include integrally-formed (with the bracket base 422), L-shaped flanges that extend outwardly away from a rear surface 431 of the bracket base 422 and inwardly toward the hood latch opening 424. In one embodiment, the corner 435 between each inner support structure attachment flange 434 and the bracket base 422 includes a deformed pocket 436. The deformed pockets 436 may be formed during stamping of the front hood latch bracket 420 and used to increase the stiffness of the flanges 434 and the overall stiffness of the bracket.

The plurality of spaced-apart hood latch keeper features 440 may have any suitable shape or size sufficient to keep or retain the perimeter 414 of the latch base 412 in slidable engagement with the bracket base 422 during installation while enabling a predetermined amount of movement of the latch base relative to the bracket base in a preinstallation position 450. In one embodiment, the plurality of spaced-apart hood latch keeper features 440 include a plurality of protruding tabs 442 that protrude outwardly away from a front surface 437 of the front hood latch bracket 420 and define a pocket 447 or space envelope that is configured to receive the latch base 412. The plurality of protruding tabs 442 may have any suitable configuration sufficient to retain the front hood latch assembly 400 while it is positioned relative to the front hood latch bracket 420 and the positioning and support structure 30.

In one embodiment, the plurality of protruding tabs 442 comprise a plurality, and more particularly at least one, tab on each opposing side 425 of the hood latch opening 424, of substantially-opposed, curved or L-shaped protruding tabs 444 with an inwardly-extending free leg that extends substantially parallel to the front surface 437, where the substantially-opposed, curved or L-shaped protruding tabs 444 are configured to define the predetermined amount of movement of the latch base in a cross-car or lateral direction 27. The protruding tabs 442 provide a lateral stop and establish the cross-car travel limits during the insertion of the latch base 412 and the front hood latch assembly 400 and will also preferably be positioned and incorporated so as to guide the insertion of the assembly and prevent or limit clocking (rotation) of the assembly as it is retained within the pocket 447 defined by the plurality of protruding tabs 442.

In one embodiment, the plurality of protruding tabs 442 also includes at least one curved or L-shaped protruding tab 446 with a free leg that extends outwardly from and substantially normal to the front surface 437 proximate a lower edge 427 of the hood latch opening 424 and configured to define the predetermined amount of movement of the latch base 412 in a vertical direction 28. In another embodiment, the at least one curved or L-shaped protruding tab 446 comprises a plurality of protruding tabs 446, and more particularly, two protruding tabs 446. The curved or L-shaped protruding tabs 446 provide a lower stop and establish the downward travel limits during the insertion of the bracket base 422 and the front hood bracket assembly 400 and will also preferably be positioned and incorporated so as to level the assembly and prevent or limit clocking (rotation) of the assembly as it is retained within the pocket 447 defined by the tabs. In one embodiment, the curved or L-shaped protruding tabs 446 will be configured so that they are able to sustain at least one front hood slam or closure where the latch base 412 may be driven into the curved or L-shaped protruding tabs 446 without plastically deforming the tabs in conjunction with the method of installation described herein.

In one embodiment, the front hood latch bracket 420 is used to form a position-controlled front hood latch bracket assembly 460 for a vehicle 12. The front hood latch bracket assembly 460 includes a positioning and reinforcement structure 30 for a front end clip 10 of a vehicle 12 that includes a plurality of position reference features for locating and fixing the positions of a plurality of vehicle components comprising the front end clip, as described herein. The front hood latch bracket assembly 460 also includes a front hood latch bracket 420 that is configured to capture and retain a front hood latch assembly 400 as one of the vehicle components in slidable engagement with a predetermined amount of movement. The front hood latch bracket 420 is attached to the positioning and reinforcement structure 30 in a predetermined location 462 (FIG. 2). In one embodiment, the predetermined location is proximate a central portion 464 of the positioning and reinforcement structure 30, and more particularly is centered on the positioning and reinforcement structure 30 in a cross-car direction 27, since the front hood latch assembly 400 must be aligned with the striker 402, which is frequently located proximate to or on an axial centerline of the front hood 404 near its front edge.

In one embodiment, the latch bracket assembly 460 includes a latch bracket 420 as described herein. The front hood latch bracket 420 includes a bracket base 422 having a hood latch opening 424 configured to receive a hood latch assembly 400 having a latch base 412, the latch base having a perimeter 414 and a plurality of locating apertures 416 as described herein. The front hood latch bracket 420 also includes a plurality of spaced-apart hood latch keeper features 440, the hood latch keeper features configured to receive and keep the perimeter 414 of the latch base 412 in slidable engagement with the bracket base 422 while enabling a predetermined amount of movement of the latch base relative to the bracket base in a preinstallation position. The front hood latch bracket 420 also includes a plurality of fastener apertures 426 each configured to receive a fastener for detachably attaching the latch base 412 to the bracket base 422, where the locating apertures having a size and a location that exposes the attachment apertures in the preinstallation position regardless of the predetermined amount of movement as described herein.

Referring to FIGS. 1-5, in one embodiment, the latch bracket assembly 460 includes a positioning and reinforcement structure 30 that comprises a top support member 32 and a bottom support member 34 each extending relatively horizontally in a cross-car direction 27 or orientation and relatively parallel to each other. The positioning and reinforcement structure 460 also includes a first side member 36 and a second side member 38 each extending relatively vertically and relatively parallel to each other, the first side member and the second side member each coupled to the top support member and the bottom support member. The positioning and reinforcement structure 460 further includes a first wing structure 70 detachably coupled to the first side member 36, the first wing structure comprising a first side flange 74 configured to operably mount to a first fender assembly. Still further, the positioning and reinforcement structure 460 includes a centering bracket 470 disposed proximate a top side 33 of the top support member 32. The centering bracket 470 is configured to locate a front region of a hood to the positioning and reinforcement structure 30.

In one embodiment, the positioning and reinforcement structure 30 comprises a primary datum reference component for a plurality of the components that make up the front end clip 10. This means that the positioning and reinforcement structure 30 is used as the principal datum reference for most, if not all, of the components that are integrated into the front end clip 10. Thus, these components are either attached to a location referencing feature of the positioning and reinforcement structure 30, or by referencing a location referencing feature of this structure. In one embodiment, the latch bracket assembly 460 includes the front hood latch bracket 420 attached to the top support member 32 in a predetermined location 462 on the front or forward-facing surface of the positioning and reinforcement structure 30. In one embodiment, the predetermined location 462 of the front hood latch bracket 420 is located a predetermined distance from the centering bracket 470 as a primary position reference feature and datum reference, and more particularly a predetermined distance in the cross-car direction 27 and the vertical direction 28.

The latch bracket assembly 460 may include a front hood latch bracket 420 that includes a plurality of spaced-apart hood latch keeper features 440 that comprise a plurality of protruding tabs 442 that protrude outwardly away from a front surface 437 of the bracket. More particularly, the plurality of protruding tabs 442 may include a plurality of substantially-opposed protruding tabs 444 or side tabs with an inwardly-extending free leg 445 that extends substantially parallel to the front surface 437, where the substantially-opposed protruding tabs 444 are configured to define the predetermined amount of movement of the latch base 412 in a cross-car direction as described herein. The plurality of protruding tabs 442 may also include at least one protruding bottom tab 446 with an orthogonally protruding free leg 443 that extends substantially orthogonally from the front surface 437 located proximate a lower edge of latch bracket opening 424 and configured to define the predetermined amount of movement of the latch base 412 in a vertical direction.

In one embodiment, the front hood latch bracket assembly 460 also includes, in addition to the front hood latch bracket 420, at least one other component, and preferably a plurality of other components positioned using the positioning and support structure 30, including a fender assembly 76, 98, headlamp 122, grill 142, fascia 22, bumper 20 and bumper attachment features, hood 404, hood latch 410, hood bumper 18, under-hood closeout panel, air baffle, radiator support 60, or a combination thereof.

In one embodiment, the overall vehicle assembly process includes a front hood latch assembly attachment method where the front hood latch bracket 420 may be used to position and detachably attach the front hood latch assembly 400 during an installation of the assembly and establishment of the latch mechanism that will be used for latching the front hood in a closed position during operation of the vehicle. An analogous method may be used to service the vehicle by installing a new front hood latch assembly 400 as described below after first removing an existing front hood latch assembly that requires replacement because it has been damaged or otherwise requires replacement. According to the method, the front hood latch bracket is attached to the positioning and reinforcement structure 30 in a predetermined location 462 as described herein to form the latch bracket assembly 460. The front hood latch assembly 400, particularly the latch base 412, is then placed in the pocket 447 on the front hood latch bracket 420 defined by the spaced-apart hood latch keeper features 440 where it is temporarily retained or staged by the bracket in a hands-free condition, so that an installer is free to release the assembly and use his or her hands to continue the installation process. The method then includes closing the front hood that already has the hood striker 402 installed, such as by having the installer slam the hood closed. Upon closure of the hood, the front hood latch assembly 400 in its free (unattached) state and a preinstallation position 450 is positioned within the front hood latch bracket 420 so that the striker 402 actuates the spring-loaded latch such that the latch captures the striker and the assembly in its free state is positioned by the hood and the striker in a position that is free from lateral stresses in a free state. This sets the plurality of fastener apertures 426 that are each configured to receive a fastener 408 for detachably attaching the latch base 412 to the bracket base 422 and the locating apertures 416 having a size and a location that exposes the fastener apertures 426 in the preinstallation position 450 regardless of the predetermined amount of movement of the latch base 412 within the pocket 447. The fasteners 408, including any washers, are then tightened into the bracket base 422, for example, to detachably attach the latch base 412 and front hood latch assembly 400 to the front hood latch bracket 420 and positioning and reinforcement structure 30.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A position-controlled front hood latch bracket for a vehicle, comprising:
   a bracket base having a front surface and a hood latch opening configured to receive a hood latch assembly, the hood latch assembly having a latch base and a hood latch within the latch base, the latch base having a perimeter and a plurality of locating apertures;
   a plurality of spaced-apart hood latch keeper features extending from the front surface of the bracket base, the hood latch keeper features configured to receive and keep the perimeter of the latch base in slidable engagement with the bracket base while enabling a predetermined amount of movement of the latch base relative to the bracket base in a pre-installation position, the plurality of hood latch keeper features comprising at least one bottom tab and at least two side tabs, the at least two side tabs configured to prevent the perimeter of the latch base from sliding beyond defined positions in a cross-car direction and the at least one bottom tab configured to prevent the perimeter of the latch base from sliding beyond a defined position in a direction perpendicular to the cross-car direction; and
   a plurality of fastener apertures in the front surface of the bracket base, each fastener aperture configured to receive a fastener for detachably attaching the latch base to the bracket base, the locating apertures having a size and a location that exposes the fastener apertures in the preinstallation position regardless of the predetermined amount of movement.

2. The bracket of claim 1, further comprising a pair of spaced-apart outer support structure attachment flanges on opposed ends of the bracket base.

3. The bracket of claim 2, wherein the flanges comprising integrally-formed, L-shaped flanges that extend outwardly from the ends and outwardly away from a rear surface of the bracket base.

4. The bracket of claim 3, wherein a corner between each outer support structure attachment flange and the bracket base includes a deformed pocket.

5. The bracket of claim 1, further comprising a pair of spaced-apart inner support structure attachment flanges on opposed sides of a hood latch opening.

6. The bracket of claim 5, wherein the flanges comprise integrally-formed, L-shaped flanges that extend inwardly from the hood latch opening.

7. The bracket of claim 6, wherein a corner between each inner support structure attachment flange and the bracket base includes a deformed pocket.

8. The bracket of claim 1, wherein the plurality of spaced-apart hood latch keeper features comprise protruding tabs that protrude outwardly away from the front surface of the bracket base.

9. The bracket of claim 8, wherein the plurality of protruding tabs comprise curved or L-shaped protruding tabs with an inwardly-extending free leg that extends substantially parallel to the front surface.

10. The bracket of claim 8, wherein the at least one bottom tab is located proximate a lower edge of the bracket base.

11. The bracket of claim 1, wherein each fastener received in the plurality of fastener apertures is a threaded bolt.

* * * * *